April 3, 1962 L. J. WOLF 3,027,962
CONTROL FOR DUAL ENGINE VEHICLES
Filed June 13, 1956 5 Sheets-Sheet 5
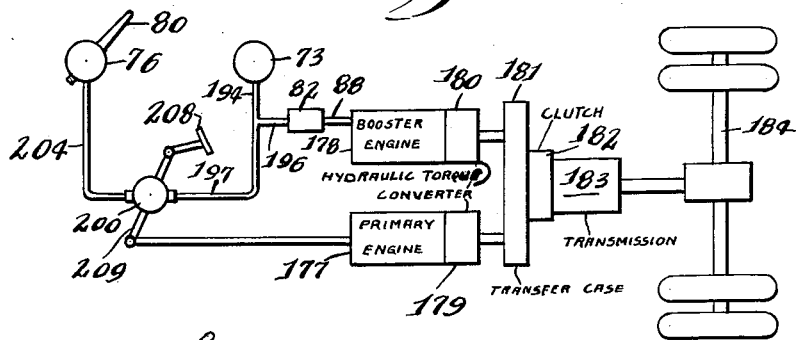
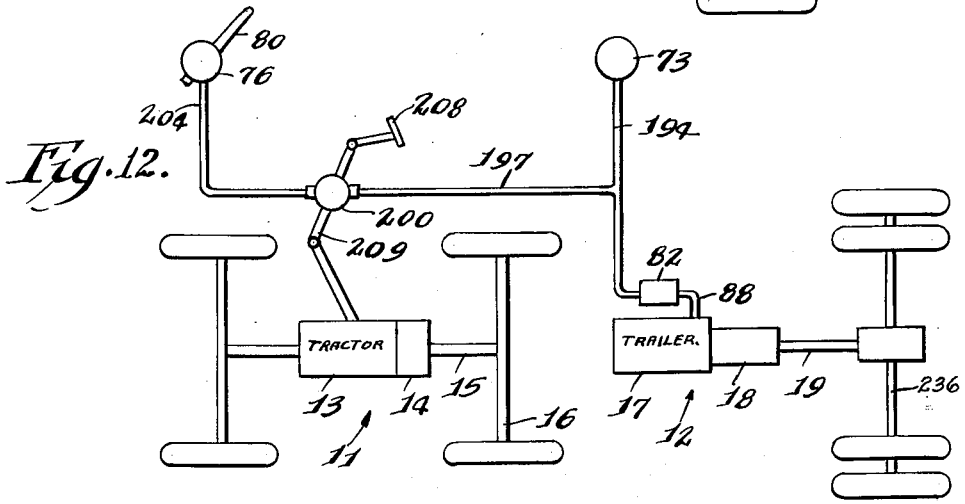
Inventor.
Lloyd J. Wolf.
By John W Darley
Attorney.

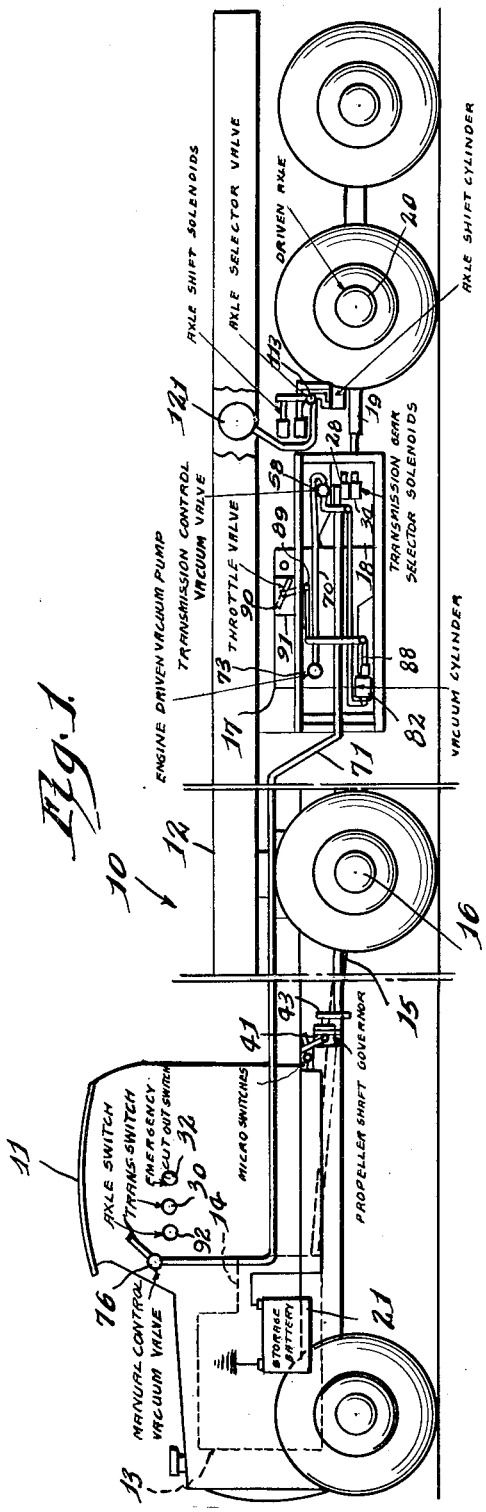

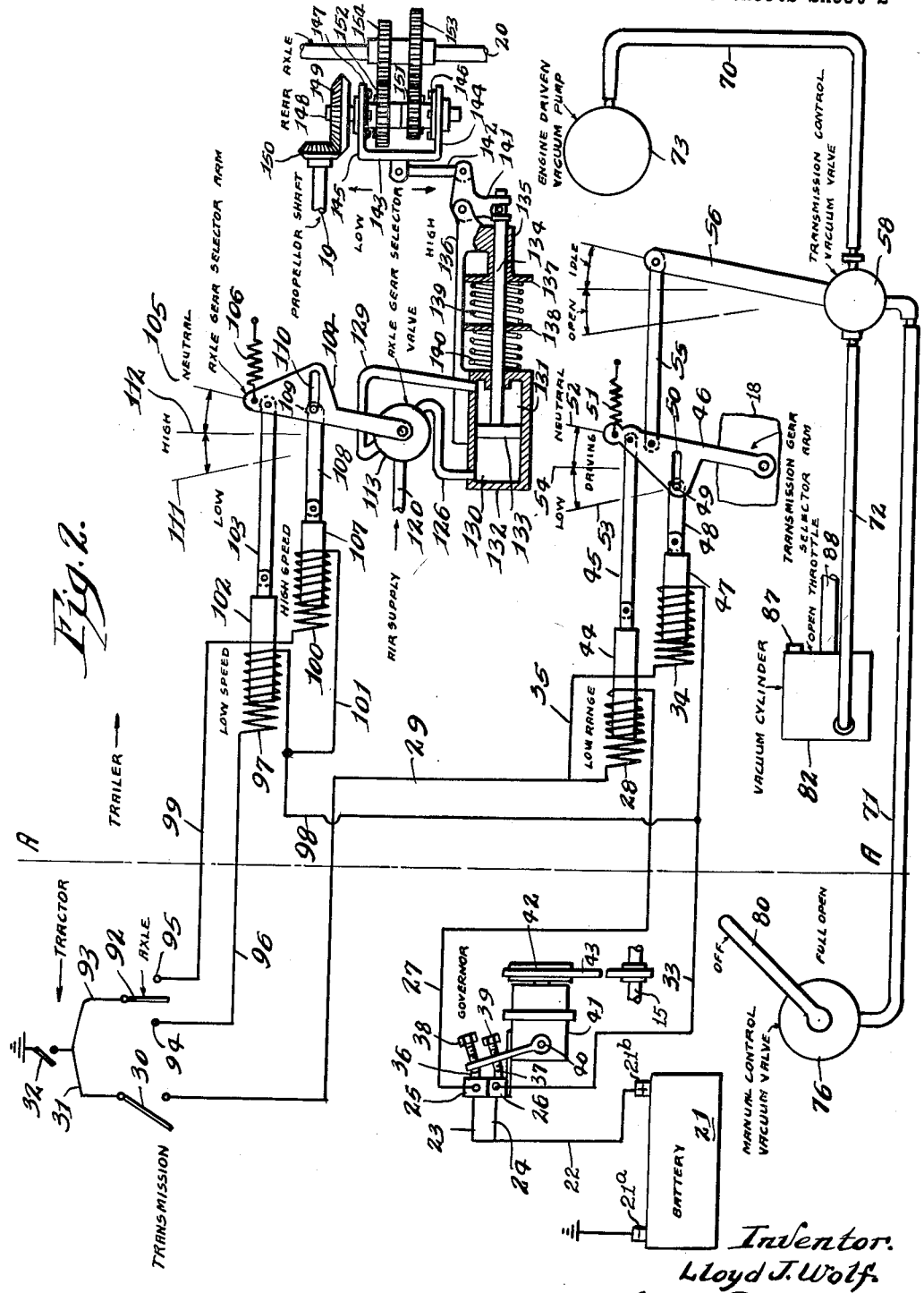

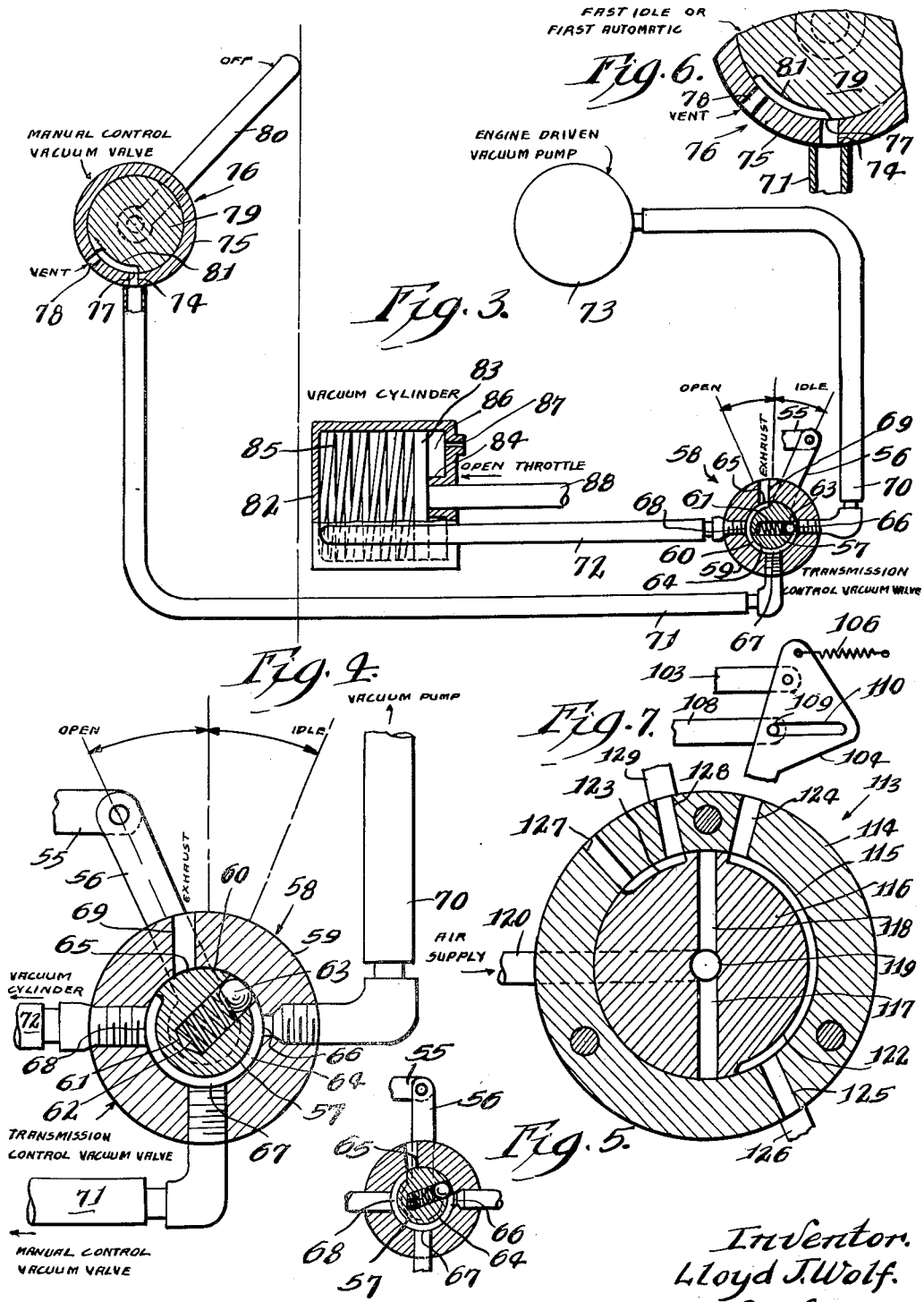

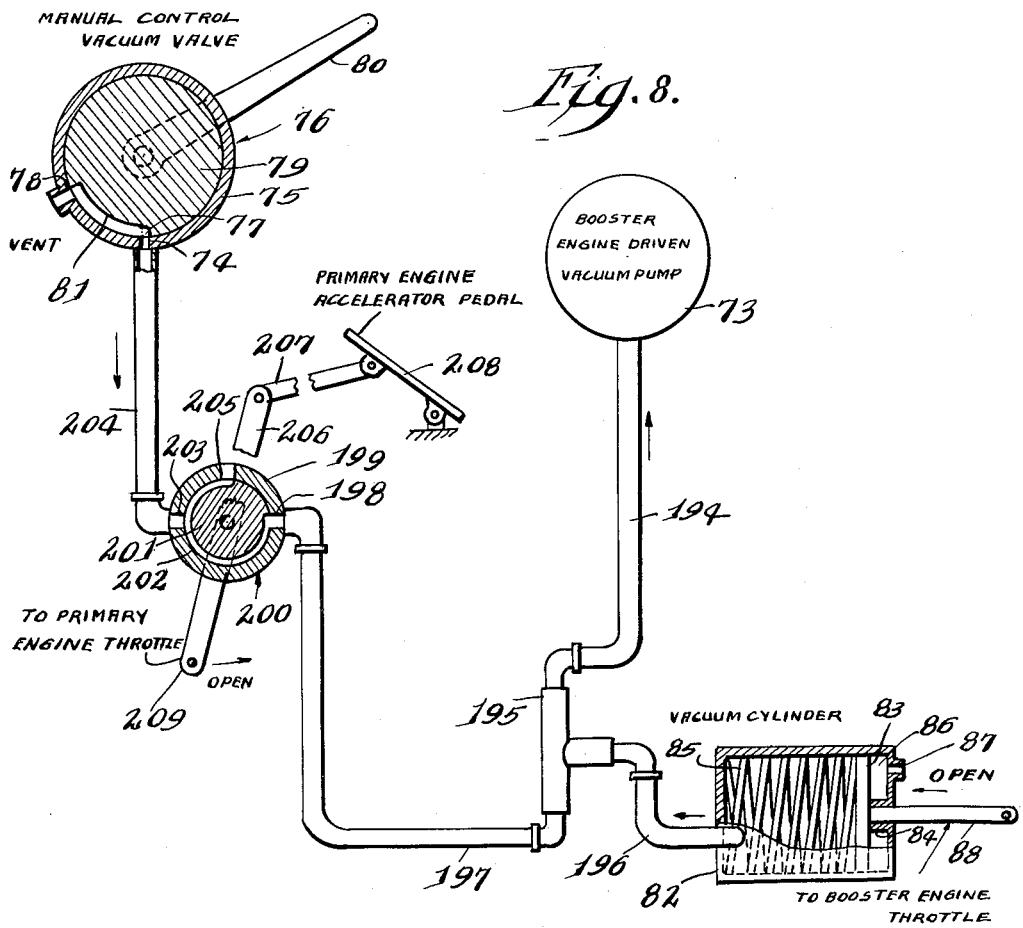
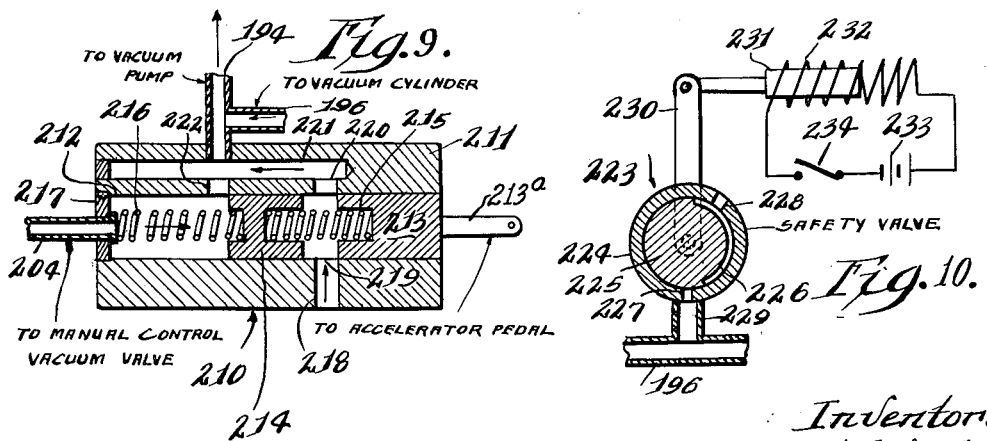
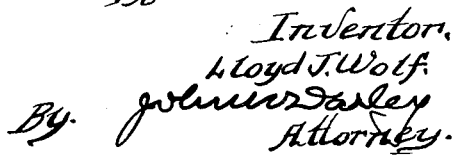

United States Patent Office 3,027,962
Patented Apr. 3, 1962

3,027,962
CONTROL FOR DUAL ENGINE VEHICLES
Lloyd J. Wolf, 99 Woodland Road, Irving, Tex.
Filed June 13, 1956, Ser. No. 591,183
7 Claims. (Cl. 180—77)

My invention relates to motor vehicles and is concerned primarily with providing an additional engine whose control is related to the speed of its propelling connection without any necessity for synchronizing both engines.

The invention is applicable to motor vehicles generally and will be described in one instance as applied to a tractor-trailer vehicle in which the additional engine is mounted on the trailer, and in other instances by showings of the same concept in relation to a motor vehicle of the non-trailer type, such as ordinary trucks and buses which are normally equipped with single engines.

In the usual vehicle of the tractor-trailer type, tthe entire power plant is mounted on the tractor and, since the engine and transmission must be sized to move the dead load of the tractor and trailer plus the pay load on the trailer, the tractor must be designed accordingly to transmit the whole tractive effort to the vehicle. This arrangement requires a heavy construction in the tractor with a corresponding reduction in the amount of the pay load on the trailer.

Moreover, with such a vehicle, difficulty is experienced in climbing steep grades and it is necessary to provide the tractor transmission with a relatively large number of speed ratios to negotiate varying road conditions as well as those encountered in cross-country movements, such as in pipe laying operations. At best, this arrangement provides for crawling movements in hilly country and owing to the absence of any tractive effort by the trailer wheels, movements across unimproved ground frequently necessitates the use of an additional tractor. Single engined buses and trucks are also characterized by the same operating difficulties.

Attempts to solve this problem have usually consisted in mounting an additional engine on the trailer, or on the bus or truck, and conditioning both engines for synchronization through connection to common accelerator and clutch pedals, by arranging both transmissions to run at the same speed, or a combination of these factors. In the first arrangement, each time that a gear shift is made in the tractor and trailer transmissions, the accompanying movements of the accelerator and clutch pedals interrupts power flow from the tractor and trailer engines simultaneously. The vehicle therefore loses headway and if then climbing a hill, the power interruption occurs at a time when sustained power flow is most needed. Substantially the same result occurs where the tractor and trailer transmissions are arranged for synchronization since both of these units would be shifted together with consequent interruption of power flow from both engines.

The traverse of steep grades and poor acceleration also present serious problems in the operation of single engine trucks and buses, particularly where it is important to meet tight schedule requirements.

It is therefor the principal object of my invention to provide a motor vehicle having a main or primary engine and an additional or booster engine whose throttle system is vacuum operated and responsive to the speed of its propelling connection.

A further object is to provide a tractor-trailer vehicle in which power distribution is effected by mounting an engine on the tractor and an independently controlled engine on the trailer which is available as required.

This application is a continuation-in-part of my copending appplication, Ser. No. 187,769, filed September 30, 1950, which has since become abandoned.

These and further objects of the invention will be set forth in the following specification, reference being had to the accompanying drawings, and the novel means by which the objects are effectuated will be definitely pointed out in the claims.

In the drawings:

FIG. 1 is a side elevation of a tractor-trailer vehicle embodying the invention in which the trailer includes a multispeed, rear axle.

FIG. 2 is a schematic view showing the relation of the trailer engine throttle, transmission and rear axle speed controls for the vehicle shown in FIG. 1.

FIG. 3 is an enlarged, fragmentary and diagrammatic view showing the relation of the vacuum control elements for determining the position of the trailer engine throttle valve as viewed in FIG. 2, the vacuum control valves being shown in positions corresponding to the idling position of the throttle valve.

FIGS. 4 and 5 are sectional views of the transmission control vacuum valve in FIG. 3 in positions determined by the low and driving ranges of the transmission, respectively, and in each of which positions, the manual control vacuum valve may be rocked to provide any desired opening of the trailer engine throttle valve beyond idling.

FIG. 6 is an enlarged, fragmentary and sectional elevation of the manual control vacuum valve in FIG. 3 in approximately first automatic position, i.e., a position such that the vacuum system first begins automatic functioning to effect opening of the throttle valve beyond idling position.

FIG. 7 is an enlarged, sectional view of the axle gear selector valve taken along a plane parallel to that in which the valve is shown in FIG. 2.

FIG. 8 is a diagrammatic view, partly in section of a modified vacuum control on the additional or booster engine which is linked with the throttle control on the primary engine.

FIG. 9 is a sectional view of a valve which is connected to the accelerator pedal for the primary engine and forms a part of the vacuum control for the throttle of the booster engine and which will provide full throttle on the booster engine whenever the primary engine throttle is moved to full open position.

FIG. 10 is a schematic view, partly in section, showing an additional control for use in connection with the FIG. 9 valve when used with a tractor-trailer vehicle.

FIGS. 11 and 12 are schematic views of a side-by-side engine equipped vehicle and of a tractor-trailer vehicle when provided with the FIG. 8 control, the numerical designations generally of the tractor, trailer and their transmissions and propelling connections being the same as in FIG. 1 with the exception of the trailer rear axle.

The trailer transmission includes a hydraulic coupling or a hydraulic torque converter and devices of this type which are suitable are those marketed under the trade marks "Dynaflo" and "Hydramatic" in which the gears are in constant mesh and change of speed ratios from "low" to "high" is fully auomatic. Also suitable is the well known four speed transmission which the gears are always in mesh, but which is not fully automatic through the four speeds. An automatic shift from first to second speed, constituting one range, is effected by a vacuum system which becomes operative when the driver lifts his foot from the accelerator pedal, but a shift from second to third speed is manually controlled. This transmission has a neutral position. A fourth alternative is a modification of the last noted transmission wherein the gear arrangement is of the clash gear type but controlled as indicated to provide low and driving ranges.

Referring to the drawings, FIGS. 1 to 7, inclusive illustrate a tractor-trailer vehicle which is characterized by automatic throttle control of the trailer engine, a speed controlled selection of the low and driving ranges of the transmission, and a multispeed ratio in the trailer rear axle.

Referring to FIG. 1, the numeral 10 designates the modified vehicle comprising a tractor 11 and a trailer 12. The tractor includes the usual engine 13 and transmission 14 which are controlled in the customary manner and connected through a propeller shaft 15 to the tractor rear axle 16.

The forward end of the trailer 12 is coupled to the rear end of the tractor in the usual manner and the former may be of any conventional type except for the power plant, transmission, rear axle and the controls therefor as presently described. Suitably carried on the under side of the trailer 12 is an internal combustion engine 17 which is connected to an automatic transmission 18 having a low and a driving range, such as present commercial forms of the "Dynaflo" and "Hydramatic" transmissions. For purpose of illustration, it will be assumed that the trailer is equipped with a "Dynaflo" transmission and that the trailer engine is of the gasoline type. The output end of the transmission 18 connects through a propeller shaft 19 to the trailer driving rear axle 20 which will be regarded as of the two speed type and will be hereinafter described. The controls for the parts noted above are schematically illustrated in FIG. 2 to which reference will now be made.

In this figure, all parts to the left of the line A—A are carried by the tractor 11 and those to the right by the trailer 12. A battery 21 has one terminal 21a grounded while the other terminal 21b connects by a wire 22 with wires 23 and 24 which in turn respectively connect with one side of so-called microswitches 25 and 26 of usual construction. The battery is generally any source of electrical power and its voltage is maintained in the conventional way by a generator (not shown) which is driven by the tractor engine 13. The other side of the switch 25 connects by a wire 27 which one side of the coil of a low range solenoid 28 and the opposite end of this coil connects by a wire 29 with one terminal of a transmission switch 30 whose other terminal connects through a wire 31 and main switch 32 with ground. The other side of the microswitch 26 connects by a wire 33 with one end of the coil of a driving range solenoid 34 whose opposite end connects by a wire 35 with the wire 29 and hence with the switch 30.

The microswitches 25 and 26 include the usual plungers 36 and 37, respectively, whose movement inward of the switches closes the same and this closure is maintained for a predetermined time when the plungers move outwardly, the plungers being biased outwardly towards open positions by parts of the switch structure. Switches of this type are generally characterized by a snap action and the plungers by short movements and are well known in the art, a typical arrangement being shown in U.S. Letters Patent No. 1,960,020, dated May 22, 1934. The plungers 36 and 37 cooperate respectively with screws 38 and 39 mounted on a rock arm 40 forming part of a typical speed responsive governor 41, only shown diagrammatically in FIG. 2. The internal construction of the governor is such that, as the speed of the governor shaft 42 increases, the arm 40 rocks clockwise and, upon a decrease in speed, the arm 40 moves towards the position shown in FIG. 2. The governor shaft 42 is driven from the tractor propeller shaft 15 by means of a belt-pulley connection designated generally by the numeral 43.

The solenoids 28 and 34 are utilized to condition the transmission 18 for its forward, low and driving ranges, respectively, and the means for accomplishing this result will now be described. The core 44 of the solenoid 28 is connected by a link 45 with the free end of a transmission gear selector arm 46 which is carried by the transmission 18 and connected internally thereof in the well known manner to determine neutral and forward drive through the transmission. The core 47 of the solenoid 34 is also connected to the arm 46 through a link 48 radially inward of the connection of the link 45 thereto, but one end of the link 48 carries a pin 49 which operates in an elongated slot 50 in the arm 46 for a purpose presently explained and the stroke of the core 47 is less than that of the core 44. The arm 46 is biased to the neutral position indicated by the numeral 52 in FIG. 2 by a spring 51 whose opposite ends are respectively connected to the arm and a convenient part of the transmission 18.

From the above, it will be apparent that when the switches 30 and 32 are closed and the rock arm 40 is either in the position shown in FIG. 2 or in a slightly rocked position, as determined by the speed of the propeller shaft 15, the solenoids 28 and 34 are energized to thereby rock the arm 46 to the low range position of the transmission 18, indicated by the numeral 53 in FIG. 2, the solenoid 28 performing the primary duty in this connection by reason of the longer stroke of its core 44 and the pin-slot or lost motion connection of the core 47 to the arm 46 enabling the latter to override the pin 49.

The screws 38 and 39 are adjusted in relation to the strokes of the plungers 36 and 37, respectively, and the movement of the arm 40 so that as the speed of the propeller shaft 15 increases and the arm 40 rocks in a clockwise direction, the screw 38 first breaks engagement with the plunger 36 which thereby moves to an open position and interrupts the circuit through the solenoid 28. The energization of the solenoid 34 is maintained by engagement of the screw 39 with the plunger 37 which continues to close its circuit so that the return of the transmission gear selector arm 46 under the pull of the spring 51 is limited to the driving range position indicated by the numeral 54 in FIG. 2. When the speed of the propeller shaft 15 has reached the top regulating speed as determined by the settings of the governor 41 and screw 39, the further movement of the arm 40 separates the plunger 37 and screw 39, thus opening the switch 26, deenergizing the solenoid 34 and permitting the arm 46 to return to neutral position 52 when power flow through the transmission ceases. When the speed of the propeller shaft 15 drops below the top regulating speed, the screw 39 first engages the plunger 37 to condition the transmission 18 for its driving range through the solenoid 34 and if the propeller shaft speed drops further to a sufficient extent, the screw 38 engages the plunger 36 and conditions the transmission 18 for its low range through the solenoid 28.

Advantage is taken of the propeller shaft speed responsive movements of the arm 46 to provide an automatic positioning of the trailer engine throttle valve through a vacuum system which will now be described (see FIGS. 1 to 6, inclusive).

The opposite ends of a link 55 are respectively connected to the arm 46 and to one end of an arm 56 whose opposite end connects with a rotor 57 (see FIGS. 3 and 4) forming part of a transmission control vacuum valve 58 that includes a casing 59 and a cylindrical chamber 60 within which the rotor 57 rocks. The rotor 57 includes a parti-diametral pocket 61 which is open at one end and against the base thereof seats a spring 62 which biases a ball 63 into contact with the annular wall of the chamber 60. Recessed in the annular face of the rotor 57 is a parti-annular channel 64 whose length will be presently established. The chamber 60 includes a plurality of ports circumferentially spaced therearound, specifically ports 65, 66, 67 and 68. The port 65 communicates through an exhaust passage 69 in the casing 59 with the atmosphere, while the ports 66, 67 and 68 communicate, respectively, with the ends of hoses 70, 71 and 72, also mounted in the casing 59.

The other end of hose 70 connects with a vacuum pump 73 of conventional type suitably driven by the trailer engine 17, so that its capacity varies with the speed of this engine. The other end of hose 71 connects with the outer end of a passage 74 (see FIG. 3) that extends through the wall of a casing 75 forming part of a manual control vacuum valve 76 located in the tractor cab, the inner end of the passage 74 terminating in a port 77. The casing 75 also includes a vent passage 78 extending through the wall thereof and spaced clockwise from the passage 74. Rockable within the casing 75 is a cylindrical rotor 79 which is actuated by an external handle 80 and which includes in the annular surface thereof a parti-annular channel 81 that, in the off position of the handle shown in FIG. 3, provides communication between the vent 78 and the passage 74 and thus with the hose 71. The other end of the hose 72 communicates with one end of a vacuum cylinder 82 in which is reciprocable a piston 83 that is biased against an internal shoulder 84 at the opposite end of the cylinder by a spring 85. On the other side of the piston 83 from the spring 85 is a chamber 86 which communicates with the atmosphere through a port 87. The piston 83 is attached to one end of a rod forming part of a linkage, generally indicated by the numeral 88, whose opposite end connects with an arm 89 (see FIG. 1) that is attached to a throttle valve 90 in the carburetor 91 of the trailer engine. Movements of the linkage 88 towards the left, as viewed in FIG. 3, shift the throttle valve 90 in an opening direction, this valve being shown in idling position in FIG. 1.

Referring to FIG. 3, it will be noted that, with the parts in the positions shown, i.e., with the engine 13 idling and the arm 56 shifted to the "idle" position by the arm 46 so that the trailer engine is not transmitting power to the axle 20, the position of the valve rotor 57 is such that the ball 63 masks the port 66, thus disconnecting the vacuum pump 73 from the valve 58, and that the portion of the cylinder 82 to the left of the piston 83 is at atmospheric pressure by reason of the fact that the hose 72 communicates through the port 68, channel 64, port 65 and passage 69 with the atmosphere. In other words, the length of the channel 64 is such that, with the rotor 57 in the position shown in FIG. 3, it connects the ports 65, 68 and 67, but ends short of the port 66. The spring 85 therefore holds the piston 83 in the position shown which corresponds to the idling position of the throttle valve 90. Also with the handle 80 in the position shown, atmospheric pressure exists in the hose 71 since the interior of the latter communicates with the atmosphere through the passage 74, port 77 which is fully open, channel 81 and vent 78.

In describing the operation of the vehicle shown in FIG. 1 so far as described, it will first be assumed that the vehicle is at rest with the tractor and trailer engines 13 and 17 idling, respectively, and hence the vacuum pump 73 operating, each of these engines having been started in the conventional manner. At this time, the switches 30 and 32 are open (see FIG. 2), the governor arm 40 is in the retracted position shown so that the microswitches 25 and 26 are closed, and since the solenoids 28 and 34 are deenergized by reason of the open switches 30 and 32, the gear selector arm 46 is in the neutral position shown. Further, the several parts of the vacuum system occupy the relative positions shown in FIG. 3 in which the vacuum pump 73 is cut off from the cylinder 82 by the ball 63.

The driver starts the vehicle moving by connecting the tractor engine 13 to the propeller shaft 15 through the usual clutch (not shown) and the transmission 14 in the conventional manner and either before, after, or simultaneously therewith, he closes the switches 30 and 32 to thereby energize the solenoids 28 and 34 and rock the gear selector arm 46 to the low range position 53 (see FIG. 2). At the same time, the connected arm 56 moves to the position shown in FIG. 4 in which the rotor 57 masks the exhaust port 65 and the ball 63 uncovers the port 66. The vacuum pump 73 then connects through the channel 64 with the hoses 72 and 71 and therefore respectively with the cylinder 82 and the manual valve 76. However, with the latter in the position shown in FIG. 3, i.e., with the hose 71 connected through the fully open port 77 to the atmosphere through the vent 78, the pump 73 is incapable of establishing sufficient vacuum to the left of or behind the piston 83 so that atmospheric pressure acting through the port 87 can move the piston 83 and hence the linkage 88 in a direction to further open the throttle valve 90.

Preferably, the manual valve rotor 79 is rocked clockwise to the approximate position shown in FIG. 6 before, after or simultaneously with the closing of the switches 30 and 32. The rotor 79 then partially masks the port 77 and reduces the air flow through the hose 71 to an extent that enables sufficient vacuum to be established behind the piston to shift the throttle valve 90 to what is known in the art as a fast idle position and which will be regarded for present purposes as the first automatic position. This term will be subsequently explained. The rotor 79 can be held in this position in any approved manner, which does not interfere with a further clockwise movement of the rotor. The first automatic position of the rotor 79 shown in FIG. 6 is diagrammatic only as it will be apparent that the actual position will depend upon the sizing of the related ports and passages and the capacity of the pump at the trailer engine speed in question.

It will be obvious that, with the trailer engine idling fast, a further clockwise movement of the rotor 79 effects a further throttling of air flow through the hose 71, a higher vacuum in the cylinder 82 and hence a further opening of the throttle valve 90 which increases the speed of the engine. When the rotor 79 completely masks the port 77, the throttle valve 90 is fully open. The handle 80 can be located in any position between fast idle and full open positions of the throttle valve 90 depending upon the power required of the trailer engine and left there, even when the trailer engine cuts out for reasons presently explained.

As the vehicle increases in speed, the governor arm 40 moves clockwise and at a speed determined by the adjustment of the screw 38, the microswitch 25 opens while the screw 39 maintains closure of the microswitch 26. Accordingly, the solenoid 28 is deenergized and the spring 51 returns the gear selector arm 46 to the driving range position 54 shown in FIG. 2 as determined by the pin 49 which is held in this position by the still energized solenoid 34.

Accompanying the shift of the arm 46 to position 54 is a rocking of the arm 56 to the position shown in FIG. 5 and while the rotor 57 rotates clockwise, it still will mask the exhaust port 65 and leaves the ports 66, 67 and 68 in communication with each other and with the vacuum pump 73. Hence, positions of the throttle valve 90 can be regulated by the valve 76 in the manner described above to provide any desired speed ratio between the tractor and trailer engines, each of which assumes its share of the total load without either engine pushing the other.

If with the arm 46 in the driving range position, the speed of the vehicle drops sufficiently to cause the governor arm 40 to rock counterclockwise and close the microswitch 25, such as when climbing a hill, the arm 46 is shifted to the low range position 53, thus taking advantage of the easier speed ratio in the transmission 18. Whether or not the shift to the low range position will require a different position of the throttle valve 90 will depend upon the judgment of the driver in relation to the road conditions and the total power available. It may be advantageous, particularly if the vehicle speed continues to fall, to select a different gear ratio in the tractor transmission 14. During this gear shift, power flow from the tractor engine 13 to the tractor rear axle 16 is interrupted and an important feature of the invention is that, during this shift, power flow to the trailer rear axle is maintained so that very little change in the headway of the vehicle occurs.

As already noted, the goveronr 41 and screw 39 are adjusted so that at some predetermined or top regulating speed of the propeller shaft 15, the governor arm 40 rocks clockwise sufficiently to open the microswitch 26 and deenergize the solenoid 34, the microswitch 25 being already open at that instant as described above. This action will occur with the gear selector arm 46 in driving range position 54 which is accordingly shifted to neutral position 52 by the spring 51 so that the trailer engine 17 is disconnected from the trailer propeller shaft 19. If the speed of the propeller shaft 15 falls below the top regulating speed, the arm 46 is restored to driving range position 54 and power flow from the trailer engine is resumed.

A further important advantage is that when the transmission 18 shifts from driving range to neutral at the top regulating speed of the propeller shaft 15, it is unnecessary to change the position of the handle 80 for the purpose of moving the throttle 90 to fast or ordinary idling position. The handle 80 is left in whatever position it occupied when power flow from the trailer engine was interrupted and the shifting of the arm 56 by the arm 46 to the position shown in FIG. 3 causes the ball 63 to close the port 66 and hence interrupt the influence of the vacuum pump 73 while, at the same time, the exhaust port 65 is unmasked and atmospheric pressure is reestablished in the cyclinder 82 to the left of the piston 83 so that the latter moves to the right and through the linkage 88 shifts the throttle valve 90 to ordinary idling as distinguished from fast idling position. Accordingly, the trailer engine 17 is prevented from racing when the transmission 18 is shifted to neutral as would otherwise occur if it was necessary to rock the handle 80 to shift the throttle valve 90 to ordinary idling position. My improved arrangement therefore eliminates driver error and forgetfulness.

When the vehicle speed falls below the top regulating speed, the transmission is immediately restored to driving range and the transmission control vacuum valve 58 assumse the position shown in FIG. 5 so that the vacuum pump 73 again becomes effective. Hence, since the valve 76 is in the same position which it occupied when the trailer engine cut out, i.e., in a position wholly or partially throttling air flow through the hose 71, the ensuing creation of a vacuum condition in the cylinder 82 quickly shifts the throttle valve 90 to the position occupied when the trailer engine cuts out. In this connection, it wil lbe noted that when the trailer engine cuts in, its throttle valve 90 is in ordinary idling position, but the trailer engine immediately speeds up by reason of its connection to the trailer rear axle 20 and since the vacuum pump 73 is driven by this engine, the vacuum established thereby rapidly opens the throttle valve 90 to a position corresponding to the engine speed and as determined by the setting of the manual valve 76.

This quick opening movement of the throttle valve 99 under the conditions just stated is primarily due to the slip connection between the trailer engine and transmission provided by the hydraulic coupling or torque converter as the case may be. Hence, when power flow through the transmission is resumed due to vehicle speed falling below the top regulating speed and communication is reestablished between the vacuum pump 73 and the cylinder 82 with the rotor 79 in at least the fast idling position shown in FIG. 6, the fact that the trailer engine is momentarily not under load by reason of the slip connection to the transmission enables the engine to quickly increase its speed to a point sufficient to take up the load.

From the foregoing, it will be apparent that the term "first automatic position" of the valve 76 means that in any position of the valve rotor 79 between the first automatic position as shown in FIG. 6 and a position in which the rotor masks the port 77, the throttle valve 90, when the trailer engine cuts in, will be automatically returned to the position which it occupied when the trailer engine cuts out without any necessity for moving the handie 80.

In the case of an emergency stop, if the vehicle speed when the brakes are applied is above the top regulating speed and hence with the trailer engine idling, the trailer transmission cuts in when the speed falls sufficiently and while the throttle valve 90 momentarily opens for reasons noted above, it quickly returns to idle position because of the decreasing vacuum available as the speed of the engine driven vacuum pump 73 falls.

Normally, the vehicle speed represents the combined efforts of both engines, with the trailer engine responsive thereto and not only cutting in and out as this speed varies below and above a top regulating speed, but with the trailer power unit having the further capacity, also responsive to vehicle speed, of changing speed ratios in the associated transmission as vehicle speed moves up and down. Even when the vehicle speed is a function only of the tractor engine, the controls for the trailer engine are always tied to vehicle speed by reason of the governor connection to the propeller shaft of the tractor. Further, throttle valve movements of the trailer engine, for any given position of the handle 80, are fully automatic between idling and whatever position was originally determined by the handle as the trailer engine cuts in and out.

Where it is desirable to have speed ratios additional to those provided by the transmission 18, the rear axle 20 may include two speeds. In FIG. 1, the trailer 12 is shown with a tandem rear axle construction and while either axle may be employed as the driving axle, it will be assumed that the forward axle 20 performs this function. A diagrammatic arrangement of this construction and the controls therefor are also illustrated in FIG. 2 which have been conveniently associated with the other mechanism in this figure already described.

Referring to FIG. 2, the fixed terminal of an axle switch 92, located in the tractor cab, connects by a wire 93 with one terminal of the main switch 32. The switch 92 is selectively swingable between contacts 94 and 95, the former connecting by a wire 96 with one end of the coil of a low speed solenoid 97 whose opposite end connects by a wire 98 with the wire 33 and hence with the microswitch 26 whose closure energizes the driving range solenoid 34. The contact 95 connects by a wire 99 with one end of the coil of a high speed solenoid 100 whose opposite end connects by a wire 101 with the wire 98 and therefore with the microswitch 26. Accordingly, it will be understood that the solenoids 97 and 100 are never simultaneously energized, but are selected depending upon the gear ratio desired in the rear axle.

The solenoid 97 includes the usual core 102 which is connected at one end by a link 103 with the free end of a rockable axle gear selector arm 104 that is biased in the neutral or off position 105 shown by a spring 106. The solenoid 100 includes a core 107 whose outer end connects with one end of a link 108 whose opposite end carries a pin 109 that operates in an elongated slot 110 formed in the arm 104 radially inward of the connection of the link 103 thereto. The core 102 has a longer stroke than the core 107, the former when the associated coil is energized, shifting the arm 104 to low gear position 111 while the latter, when the coil of the solenoid 100 is energized, shifts or holds the arm to or in the high gear position 112, the slot or lost motion connection 110 permitting overriding of the pin 109 when the arm 104 is rocked to position 111.

The rocking of the arm 104 determines the position of an axle gear selector valve 113 which controls the admission and exhaust of air under pressure to and from a double acting piston mechanism presently described. Referring to FIG. 7 which more particularly shows the valve construction, it comprises a casing 114 having a cylindrical chamber 115 in which rocks a similarly shaped rotor 116 to which the inner end of the arm 104 is connected. Aligned, radial passages 117 and 118 extend through the rotor 116 with their outer ends terminating at the annular surface thereof and their inner ends communicating with a passage 119 extending axially of the rotor 116. One end of the passage 119 communicates through the casing 114 with a hose 120 which in turn connects with a source of air under pressure, such as a tank 121 (see FIG. 1) that is maintained at a predetermined pressure by conventional means not shown. Air under pressure is therefore always present in the passages 117 and 118.

Parti-annular, long and short channels 122 and 123 are recessed in the peripheral surface of the rotor 116, the ends of the channel 122 terminating adjacent the outer ends of the passages 117 and 118, all respectively, while the channel 123 is located on the opposite side of the passage 118 with one end terminating adjacent this passage and the opposite end spaced a convenient distance therefrom.

With the rotor 116 in the position shown in FIG. 7, the channel 122 provides communication between passages 124 and 125 which extend through the casing 114 and respectively communicate with the atmosphere and with one end of a hose 126, while the channel 123 connects passages 127 and 128 which also extend through the casing 114 and respectively communicate with the atmosphere and one end of a hose 129.

Referring to FIG. 2, the other ends of the hoses 126 and 129 respectively communicate with chambers 130 and 131 provided at opposite ends of a cylinder 132 in which is reciprocable a double acting piston 133 that separates the chambers and is mounted on a rod 134 that extends through one end of the cylinder and a bearing 135 spaced therefrom and forming part of a bracket 136 that is carried by the cylinder. An abutment plate 137 is fast to the bearing 135 and a second abutment plate 138 is positioned midway between the plate 136 and the adjacent end of the cylinder 132, both plates being coaxial with the rod 134 and the plate 138 being secured to this rod in any approved manner. A spring 139 encircles the rod 134 between the plates 137 and 138 and a similar spring 140 is located between the plate 138 and the adjacent end of the cylinder 132. These springs are of equal strength and bias the piston 133 to the intermediate position shown which determines the neutral of the two speed axle.

The rod 134 extends through the bearing 135 for connection with one arm of a lever 141 that is pivoted on the bracket 136, the other lever arm being connected through a link 142 with a shiftable yoke 143 having spaced forked arms 144 and 145 which respectively engage clutch members 146 and 147 splined to a jack shaft 148 which is parallel to the rear axle 20, the arms 144 and 145 being arranged to axially shift the members 146 and 147 while permitting rotation of the latter. One end of the jack shaft 148 carries a bevel gear 149 which meshes with a bevel pinion 150 secured to the output end of the propeller shaft 19. Between the clutch members 146 and 147 are pinions 151 and 152 which are freely journaled on the jack shaft 148 and held against axial movement in any desired manner, one side of each of the pinions 151 and 152 being arranged for clutching engagement with the members 146 and 147, respectively. The pinions 151 and 152 mesh with gears 153 and 154, respectively, that are keyed to the rear axle 20, with the pinion 151 and gear 153 constituting the low gear of the axle and the pinion 152 and gear 154 forming the high gear. For the sake of clearness, the differential gear mechanism has been omitted.

As noted in FIG. 2, the solenoids 97 and 100 are deenergized and the valve 113 is in the position shown in FIG. 7 wherein the outer ends of the passages 117 and 118 are masked by the casing 114 and both chambers 130 and 131 are at atmospheric pressure since the former communicates through the hose 126, passage 125, channel 122 and passage 124 with the atmosphere, while the chamber 131 communicates through the hose 129, passage 128, channel 123 and passage 127 with the atmosphere. Hence, the piston 133 is balanced in the neutral position shown by the springs 139 and 140 and the clutch members 146 and 147 are free of engagement with the pinions 151 and 152, respectively.

This capacity to break connection between the rear axle 20 and transmission 18 is an important feature of the invention. In automatic transmissions of the "Dynaflo" and "Hydramatic" type, speed ratios are controlled by speed bands and clutches which are hydraulically actuated by liquid discharged by pumps, one being engine driven and the other being responsive to vehicle speed. Hence, when the trailer is being towed by the tractor, the ability to break connection between the trailer propeller shaft 19 and trailer rear axle 20 prevents unwanted operation of the pumps noted above and therefore possible burning out of the speed bands and clutches.

When the vehicle is placed in motion by the tractor engine 13, the switch 92 is swung to engage either the contact 94 or 95, depending upon the conditions of operation, simultaneously with or prior to the closing of the switch 30. Assuming that contact 94 is engaged, the low speed solenoid 97 is thereby energized, thus shifting the arm 104 to the low speed position 111 and rocking the valve rotor 116 counterclockwise until the outer end of the passage 117 registers with the passage 125 to thereby admit compressed air through the hose 126 to the chamber 130. At the same time, the outer end of the passage 118 is masked by the annular wall of the chamber 115 between the passages 127 and 128 while the channel 122 provides communication between the passages 128 and 124 so that the cylinder chamber 131 is open to the atmosphere. Accordingly, the piston 133 moves to the right, as viewed in FIG. 2, compresses the spring 139 and through the lever 141 and link 142 shifts the yoke 143 and effects engagement of the low speed pinion 151. Power connection to the rear axle 20 through the latter's low speed gear is now complete and the trailer engine can be accelerated in the manner described above.

As the speed of the vehicle rises, it will ordinarily be desirable to utilize the high gear of the rear axle. For this purpose, the switch 92 is moved to engage the contact 95, thus deenergizing the low speed solenoid 97 and energizing the high speed solenoid 100 whereupon the arm 104 under the pull of the spring 106 shifts to the high speed position 112 where it is held by the pin 109. The valve rotor 116 is thereby rocked clockwise to shift the outer end of the passage 118 from between the passages 127 and 128 where it was masked by the wall of the chamber 115 into registration with the passage 128. At the same time, the outer end of the passage 117 moves out of registration with the passage 125 and communication is established through the channel 122 between passages 125 and 124. Hence, compressed air is supplied to the chamber 131 and the chamber 130 is open to the atmosphere. Accordingly, the piston 133, urged by the hitherto compressed spring 139 and the air pressure in the chamber 131, moves to the left and through the lever 141, link 142 and yoke 143 disengages the clutch member 146 and engages the clutch member 147 to establish drive through the high gear set comprising the pinion 152 and gear 154.

At any speed of the vehicle below the top regulating speed as defined above, and while the trailer transmission 18 is in low or driving range, either of the gear ratios in the rear axle may be selected at will to meet road conditions, thus providing a more flexible arrangement than that afforded by the transmission alone.

Another important feature is the automatic shifting of the two speed rear axle to neutral when the top regulating speed of the vehicle is reached. This facility arises by reason of the tying in of the low and high speed circuits which control the selection of the rear axle speeds with the circuit which controls the driving range of the transmission 18. At the top regulating speed, the microswitch 26 opens which not only deenergizes the driving range solenoid 34 so that the transmission gear selector arm 46 returns to neutral position 52, the low range solenoid 28 having previously been deenergized, all as described above, but also either the low speed solenoid 97 or the high speed solenoid 100 is deenergized depending upon the position of the axle switch 92 so that the rear axle structure is conditioned for neutral. Further, when the speed of the vehicle falls below the top regulating speed, the closing of the microswitch 26 simultaneously energizes the solenoid 34 and either the solenoid 97 or the solenoid 100 to thereby restore the transmission 18 and rear axle 20 to power transmitting condition. In other words, the transmission and the rear axle gear sets are simultaneously and automatically conditioned for power transmission below a determined vehicle speed and simultaneously and automatically shifted to neutral above this speed without any requirements on the part of the driver.

Where the complete system as shown in FIG. 2 is employed, the switch 32 serves as a single cut-out switch whose opening interrupts all circuits and therefore provides a convenient device for quickly shifting the transmission and rear axle to neutral in the event of an emergency stop of the vehicle.

Referring to FIG. 8, there is schematically shown a modified vacuum control system for the booster engine throttle valve whose automatic conditioning is determined by positions of the primary engine throttle and therefore related to the speed of the latter engine, or, in other words, the vacuum system is responsive to the speed of the propelling connection to the axle means. In FIG. 2, the automatic positioning of the throttle of the trailer engine 17, is governor responsive to the speed of the propelling connection to the axle means. Hence, in all variations disclosed herein, automatic positioning of the trailer or booster engine throttles is responsive to vehicle speed.

Since some of the parts in the FIG. 8 vacuum system are generally identical in structure and function with the corresponding system parts shown in FIG. 3, they are identified by like numerals.

The vacuum pump 73 connects by pipe 194 with one branch of a T 195 and a pipe 196 connects a second branch of this T with the vacuum cylinder 82 on the spring loaded side of the piston 83. The third branch of the T 195 connects by pipe 197 with a port 198 provided in a casing 199 forming part of a vacuum valve 200 whose operation is controlled by the accelerator pedal for the primary engine as presently described. Rockable within the casing 199 is a rotor 201 which includes on the peripheral surface thereof a parti-annular channel 202. Generally opposite to the port 198 and in the casing 199 is a second port 203 that connects through pipe 204 with the passage 74 in the vacuum valve 76 and hence with the port 77 thereof. The casing 199 also includes a third port 205 which communicates with the atmosphere at one end and at the opposite end with the channel 202 during a determined movement of the rotor 201 as presently explained.

Secured to the rotor 201 externally of the casing 199 is a lever 206, one arm of which connects through appropriate linkage 207 with the accelerator pedal 208 for the primary engine while the other arm 209 connects with the throttle (not shown) of the primary engine. With the rotor 201 in the position shown in FIG. 8, the primary engine is idling and the atmosphere port 205 is uncovered and connects through the channel 202 with the ports 198 and 203. For convenience, the manual vacuum valve 76 is shown in the first automatic position as defined above and as shown in FIG. 6 for the FIG. 2 control.

By way of example, the operation of the vacuum control system shown in FIG. 8 will be described in connection with the vehicle shown in FIG. 11. This control is concerned only with an automatic response of the throttle of the booster engine 178 to the speed of its propelling connection and not with an additional and linked control of the transmission as shown in FIG. 2. The latter may consist of any of the automatic types of transmission referred to above which obey their own laws as to shifting, or it may be a selectively controlled, clash gear type. The latter will be considered as included in the FIG. 11 vehicle.

Considering the FIG. 11 vehicle at rest with both engines idling and assuming equal size engines, the clutch 182 disengaged, and the transmission 183 in some selected gear, it will be apparent that the idling speeds of both engines will be identical since they connect to the common transfer case 181. The rotor 201 is in the position shown in FIG. 8 which determines the idling position of the throttle of the primary engine 177 and while the manual vacuum valve 76 is in the first automatic position, the uncovering of the port 205 by the rotor 201 prevents the vacuum pump 73 from establishing any vacuum in the cylinder 82 so that the throttle of the booster engine 178 is in ordinary idling position. In other words, the capacity of the vacuum pump 73 at the then speed of the booster engine 178 in relation to the then sizes of the ports 77 and 205 is such that all of the air intake to the pump 73 is through the ports 77 and 205 and no air is drawn from the vacuum cylinder 82 so that the piston 83 is in the ordinary idling position shown in FIG. 8.

It will be apparent therefore that any reduction in the size of either the port 77, or the port 205, or in both of them, provides a control on the creation of a vacuum in the cylinder 82 and hence on the position of the throttle of the booster engine 178.

The accelerator pedal 208 is then depressed to rock the rotor 201 counterclockwise and further open the throttle of the primary engine 177, the clutch 182 is engaged and the vehicle begins moving. Since the booster engine 178 is tied in with the rear axle 184, the revolutions per minute of this engine always bear a direct ratio to the speed of this axle. Hence, as the vehicle accelerates, the speed of the booster engine 178 also increases along with that of the vacuum pump 73 driven thereby and since the movement of the rotor 201 is in a direction towards gradual closing of the port 205, air movement through this port becomes more restricted. Therefore, at this increased speed of the booster engine 178, the vacuum pump 73, having its total intake through the ports 205 and 77 (first automatic position) decreased, begins withdrawing air from the vacuum cylinder 82 and atmospheric pressure shifts the piston 83 towards the left in FIG. 8 to effect an opening movement of the throttle of the booster engine 178 whose extent will depend upon the speed of the booster engine.

In all positions of the rotor 201 between full opening and full closing of the port 205, not only will the throttle position of the primary engine 177 and hence its speed vary, but for any given position of the manual control valve 76, the throttle position of the booster engine 178 will also vary and this latter variation will be automatic and in direct ratio to the speed of the axle 184. When the port 205 is fully closed by the rotor 201, control on the booster throttle is shifted to the port 77.

Automatic positions of the manual vacuum valve 76 range from the first position generally shown in FIG. 8 to a full closure of the port 77, it being understood that the valve 76 is manually placed in any of these positions, the term "automatic" referring to the booster engine throttle response. When the port 77 is closed, vacuum control shifts to the port 205. Within the automatic range and short of full closure of the port 77, the booster engine supplies a minimum of about 5% and about a maximum of 30% of its power. An increase in booster engine power above this maximum can be obtained by manually actuating the valve 76 to fully close the port 77 and assuming a full closure of the port 205.

Further, the control shown in FIG. 8 may also be applied to the trailer engine 17 in FIG. 1 which also connects with a vehicle axle and as schematically shown in FIG. 12. Functionally, the valve 200 has attributes similar to the valve 58 in FIG. 2.

FIG. 12 schematically shows the application of the FIG. 8 control to a tractor-trailer vehicle and, by way of example, the numerical designations are respectively identical with those applied to the engines and transmissions of the tractor and trailer in FIG. 1, and with those applied to the primary or tractor engine throttle and booster or trailer engine throttle controls in FIG. 8. Accordingly, the trailer transmission 18 may be any of the automatic types referred to above which are conditioned for drive therethrough in the well known manner, such as by suitable linkage controlled from the cab of the vehicle. However, since the FIG. 8 control is concerned only with determining positions of the booster engine throttle, the booster engine transmission is merely incidental and only forms a part of the propelling connection to the associated rear axle. Hence, so far as the application of the FIG. 8 control is concerned, the type of booster engine transmission is not important and it may be any of the well known non-automatic types of gear transmissions whose drive settings are remotely controlled from the cab, either pneumatically, hydraulically or electrically as disclosed, for example, in U.S. Letters Patent No. 2,140,109, dated December 13, 1938. Accordingly, the transmission 18 in FIG. 12 is deemed to be representative of automatic and non-automatic transmissions and, for any type thereof, power flow is through the propeller shaft 19 to the usual rear axle 236.

In FIG. 9 is schematically and sectionally shown a modified valve 210 which may be substituted for the valve 200 in the FIG. 8 control and whose operation eliminates any necessity for closing the port 77 by a manual shift of the valve 76 when full power is desired from the booster engine 178 in FIG. 11 or the trailer engine 17, assuming that the valve 210 is associated therewith. Certain parts are functionally identical with some shown in FIG. 8 and are denoted by the same numerals.

Specifically, the valve 210 includes a casing 211 having a chamber 212 extending longitudinally thereof and reciprocable in this chamber at one end thereof is a piston valve 213 carrying a prong 213a which connects with the accelerator pedal 208 in such a way that a depression of the pedal shifts the valve 213 towards the left. A second piston valve 214 is shiftably positioned in the chamber 212 in spaced relation to the piston valve 213. A helical spring 215 is interposed between the opposed ends of the valves 213 and 214 and another helical spring 216 is interposed between the other end of the valve 214 and a disk 217 which closes the end of the chamber 212 remote from the valve 213. The spring 215 is characterized by a substantially lower rate than the spring 216 for a purpose presently explained.

A transverse passage 218 extends inwardly from the periphery of the casing 211 where it communicates with the atmosphere to intersection with the chamber 212 and to form a port 219 whose function is similar to the port 205 in FIG. 8, as presently explained. A short, transverse passage 220 is positioned in opposed relation to the port 219 and provides communication between the opposed ends of the piston valves 213 and 214 from the chamber 212 to a longitudinal passage 221 that is wholly included in the casing 211. A short, transverse passage 222 connects the passage 221 with the portion of the chamber 212 to the left of the piston valve 214 and also communicating with the same chamber portion is the pipe 204 leading to the manual vacuum valve 76. Further, the pipe 194 leads from the passage 221 to the vacuum pump 73 and also connects with the pipe 196 leading to the vacuum cylinder 82.

The valve 210 is shown in the same functional position as the valve 200 in FIG. 8, i.e., both engines idling, the piston valve 213 fully uncovering the port 219 corresponding to the like position of the rotor 201 relative to the port 205, and the piston valve 214 fully uncovering the passage 222. For normal operation short of full opening of the trailer engine throttle, the valve 210 is functionally equivalent to the valve 200 in that depressions of the accelerator pedal 208 shift the piston valve 213 towards the left to vary the opening of the port 219 and hence, for any given setting of the valve 76, exerting a control on the throttle of the trailer engine 17 in the manner described above. These movements of the piston valve 213 do not affect the piston valve 214 because of the softer nature of the spring 215.

For full trailer engine throttle, the accelerator pedal 208 is fully depressed and the piston valve 213 is shifted sufficiently to move the piston valve 214 to close the passage 222, thus denying air flow through the port 77 in any automatic position of the valve 76 and enabling the piston 83 to shift the throttle of the trailer engine 17 to full open position.

Where the valve shown in FIG. 9 is used in a tractor-trailer vehicle as generally shown in FIG. 1, it is desirable to make provision for the situation where the driver, in moving the vehicle in reverse, employs only the primary engine and does not wish to change any forward speed relation that exists in the transmission connection to the trailer engine. This is accomplished by the auxiliary control schematically shown in FIG. 10 which prevents opening of the trailer engine throttle when the accelerator pedal for the primary engine is depressed.

Referring to FIG. 10, the numeral 223 designates a safety valve including a casing 224 and a rotor 225 rockable therein provided with a parti-annular channel 226 around its peripheral surface. Spaced ports 227 and 228 extend through the wall of the casing 224, the port 227 connecting through a pipe 229 with the pipe 196 leading to the vacuum cylinder 82 and the port 228 providing communication between the atmosphere and the channel 226.

Externally of the casing 224, the rotor 225 is fast to one end of a rock arm 230 whose opposite end connects with a core 231 operably related to a solenoid coil 232 that is included in an electric circuit having a battery 233 and a switch 234 conveniently located in the vehicle cab.

During all forward operations, the switch 234 is open and the rotor 225 is in the position shown wherein it masks the port 227, but before executing a reverse movement of the vehicle in the manner referred to above, the switch 234 is closed to thereby energize the coil 232 and effect a clockwise rocking of the rotor 225 to connect the ports 228 and 227 through the channel 226. Hence, regardless of the extent of opening of the primary engine throttle, the throttle of the trailer engine will remain unaffected since the vacuum pump will merely pull air through the port 228 and no vacuum will be established in the vacuum cylinder 82.

I claim:

1. In a motor propelled carrier, the combination of an engine having a throttle valve therefor and drivably connected to an axle of the carrier and a remotely controlled vacuum system for determining positions of the throttle valve comprising a vacuum pump driven by the engine, a cylinder having a piston reciprocable therein and connected to the throttle valve, the piston being constantly subjected to atmospheric pressure on one side and biased on the other side to a position determining the idling position of the throttle valve, first valve means having an exhaust port and shiftable between a position closing the exhaust port and establishing a vacuum creating connection of the pump with the biased side of the piston and a position breaking said connection and connecting the biased side of the piston to the exhaust port, and manually controlled valve means having a constantly open vent port and a passage communicating with the first valve means and operable to regulate air flow from the vent port through the passage when the pump is connected to the cylinder to vary the extent of vacuum therein and the position of the throttle valve.

2. In a motor vehicle, the combination of a primary engine, a booster engine, each engine having a throttle and propelling connections to axle means of the vehicle, lever means for controlling the position of the primary engine throttle, and a vacuum system for determining positions of the booster engine throttle comprising a positive displacement vacuum pump driven by the booster engine, a cylinder having a piston reciprocable therein and connected to the booster engine throttle, the piston being constantly subjected to atmospheric pressure on one side and biased on the other side to a position determining the idling position of the booster engine throttle, means connecting the vacuum pump to the cylinder on the biased side of the piston, valve means responsive to the lever means having an atmosphere connecting port and passage means connecting with the vacuum pump and the biased side of the piston and shiftable between a position placing the atmosphere port in communication with the biased side of the piston and a position closing the atmosphere port, and manually controlled valve means having a constantly open vent port and a passage communicating with the lever responsive valve means and operable to regulate air flow from the vent port through the lever responsive valve means to vary the extent of vacuum in the cylinder.

3. In a motor vehicle, the combination of a primary engine, a booster engine, each engine having a throttle and propelling connections to axle means of the vehicle, pedal means for moving the primary engine throttle between idling and full open positions, and a vacuum system for determining positions of the booster engine throttle comprising a positive displacement vacuum pump driven by the booster engine, a cylinder having a piston reciprocable therein and connected to the booster engine throttle, the piston being constantly subjected to atmospheric pressure on one side and biased on the other side to a position determining the idling position of the booster engine throttle, means connecting the vacuum pump to the cylinder on the biased side of the piston, valve means responsive to the pedal means having an atmospheric connecting port and passage means connecting with the vacuum pump and the biased side of the piston and shiftable between a position placing the atmosphere port in communication with the biased side of the piston to determine the idling position of the booster engine throttle and a position closing the atmosphere port, manually controlled valve means having a constantly open vent port and a passage communicating with the pedal responsive valve means and operable to regulate air flow from the vent port through the pedal responsive valve means to vary the extent of vacuum in the cylinder, and means forming a part of the pedal responsive valve means for interrupting communication between the vacuum pump and the manually controlled valve means when the primary engine throttle is fully opened.

4. In a motor propelled carrier, the combination of an engine having a throttle valve therefor and drivably connected to an axle of the carrier and a remotely controlled vacuum system for determining positions of the throttle valve comprising a vacuum pump driven by the engine, a cylinder having a piston reciprocable therein and connected to the throttle valve, the piston being constantly subjected to atmospheric pressure on one side and biased on the other side to a position determining the idling position of the throttle valve, first valve means having an atmosphere connecting port, piping means connecting the vacuum pump and the biased side of the piston with the first valve means, the first valve means being shiftable between a position placing the fully open atmosphere port in communication with the biased side of the piston and any position including part and full closure of the atmosphere port in which the vacuum pump develops a condition of vacuum on the biased side of the piston, and manually controlled valve means having a constantly open vent port and a passage communicating with the first valve means and operable to regulate air flow from the vent port to vary the extent of vacuum in the cylinder.

5. A motor propelled carrier as defined in claim 4 wherein the first valve means includes a casing provided with the atmosphere connecting port and other ports respectively connecting with the piping means and passage, and a rotor in the casing including a parti-annular channel recessed therein and constituting a duct means, the rotor being rockable between positions opening and closing the atmosphere port.

6. In a motor vehicle, the combination of a primary engine, a booster engine, each engine having a throttle and propelling connections to axle means of the vehicle, lever means for controlling the position of the primary engine throttle, and a vacuum system for determining positions of the booster engine throttle comprising a vacuum pump driven by the booster engine, a cylinder having a piston reciprocable therein and connected to the booster engine throttle, the piston being constantly subjected to atmospheric pressure on one side and biased on the other side to a position determining the idling position of the booster engine throttle, valve means responsive to the lever means and having an atmospheric connecting port, piping means connecting the vacuum pump and the biased side of the piston with the valve means, the valve means being shiftable between a position placing the fully open atmosphere port in communication with the biased side of the piston and any position including part and full closure of the atmosphere port in which the vacuum pump develops a condition of vacuum on the biased side of the piston, and manually controlled valve means having a constantly open vent port and a passage communicating with the lever responsive valve means and operable to regulate air flow from the vent port to vary the extent of vacuum in the cylinder.

7. A motor vehicle as defined in claim 6 wherein means forming a part of the lever responsive valve means is provided for interrupting communication between the vacuum pump and the manually controlled valve means when the primary engine throttle is fully opened.

References Cited in the file of this patent

UNITED STATES PATENTS

| | | |
|---|---|---|
| 1,768,530 | Short | June 24, 1930 |
| 1,868,130 | Baurer et al. | July 19, 1932 |
| 2,048,926 | Dillon | July 28, 1936 |
| 2,140,109 | Kellar | Dec. 13, 1938 |
| 2,235,175 | Simpkins et al. | Mar. 18, 1941 |
| 2,343,265 | Price | Mar. 7, 1944 |
| 2,384,782 | Rockwell et al. | Sept. 11, 1945 |
| 2,419,807 | Wilcox | Apr. 29, 1947 |
| 2,419,811 | Beall | Apr. 29, 1947 |
| 2,419,912 | Ormsby | Apr. 29, 1947 |